United States Patent [19]

Huang et al.

[11] Patent Number: 5,666,383

[45] Date of Patent: Sep. 9, 1997

[54] VARIABLE RATE DISCRETE MULTIPLE TONE BIDIRECTIONAL TRANSMISSION

[75] Inventors: Kung-Shiuh Huang, Irvine, Calif.; Steven Peter Monti, Raleigh, N.C.; Antonio Ruiz, Yorktown Heights, N.Y.

[73] Assignee: International Business Machines Corporation, Armonk, N.Y.

[21] Appl. No.: 643,443

[22] Filed: May 8, 1996

[51] Int. Cl.$^6$ ............................. H04K 1/10; H04L 27/28
[52] U.S. Cl. .................. 375/260; 375/219; 375/220; 348/398
[58] Field of Search ..................... 375/260, 219, 375/220; 348/398

[56] References Cited

U.S. PATENT DOCUMENTS

| | | | |
|---|---|---|---|
| 5,170,413 | 12/1992 | Hess et al. | 375/38 |
| 5,479,447 | 12/1995 | Chow et al. | 375/260 |
| 5,519,731 | 5/1996 | Cioffi | 375/260 |
| 5,535,240 | 7/1996 | Carney et al. | 375/219 |
| 5,537,435 | 7/1996 | Carney et al. | 375/219 |
| 5,559,834 | 9/1996 | Edler | 375/260 |

*Primary Examiner*—Stephen Chin
*Assistant Examiner*—Mohammad Ghayour
*Attorney, Agent, or Firm*—Douglas W. Cameron; Anne Vachon Dougherty

[57] ABSTRACT

This invention provides a method and apparatus for providing easily adaptable and select transmission and reception rates between a number of clients and a server. With this invention a broadband signal is transmitted/received from the server to the clients, who individually may need to receive/transmit only a small portion of the composite signal. More specifically, this invention uses discrete multiple tone coding to provide the easily adaptable and selected transmission rates to the clients.

2 Claims, 2 Drawing Sheets

VARIABLE RATE DISCRETE MULTIPLE TONE BIDIRECTIONAL TRANSMISSION

TECHNICAL FIELD

Using Discrete Multiple Tone (DMT) codes, the present invention is a method and apparatus for providing variable rate transmission to a number of clients from a server with minimal hardware complexity.

DESCRIPTION OF THE PRIOR ART

In the multimedia broadband communication environment (e.g. video on demand for many users), one server can serve many clients. Different clients may desire different communication rates. The problem here is how to efficiently and economically provide such variable rate service. Background art related to this invention is described in the following references.

U.S. Pat. No. 5,243,629 shows how to divide a signal into a plurality of classes and modulate each class into a subchannel. It doesn't teach how to to provide easily adaptable and selective transmission reception rates to clients.

U.S. Pat. No. 5,272,724 shows how to obtain timing synchronization for a wide-band signal between a transmitter and a receiver. It doesn't teach how to use Discrete Multiple Tone Coding to provide easily adaptable and selective transmission reception rates to clients.

U.S. Pat. No. 4,206,462 shows how to modulate a carrier wave with a sub-carrier wave. It doesn't teach how to use Discrete Multiple Tone Coding to provide easily adaptable and selective transmission reception rates to clients.

U.S. Pat. No. 4,701,945 shows how to generate a subcarrier signal which is encoded on the carrier signal by frequency modulation of the carrier. It doesn't teach how to use Discrete Multiple Tone Coding to provide easily adaptable and selective transmission reception rates to clients.

U.S. Pat. No. 5,301,054 shows the transmission of AM-VSB Video signals over an optical fiber. It doesn't teach how to use Discrete Multiple Tone Coding to provide easily adaptable and selective transmission reception rates to clients.

U.S. Pat. No. 5,418,785 shows how to utilize subcarrier multiplexing (SCM) over token-ring network with single optical fiber. It doesn't teach how to use Discrete Multiple Tone Coding to provide easily adaptable and selective transmission reception rates to clients.

U.S. Pat. No. 5,416,767 shows a method of transmitting data by modulating a frequency multiplex of carders at a relatively low symbol rate. It doesn't teach how to use Discrete Multiple Tone Coding to provide easily adaptable and selective transmission reception rates to clients.

U.S. Pat. No. 5,274,629 shows how to broadcast digital data with time-frequency interlacing and coherent demodulation. It doesn't teach how to use Discrete Multiple Tone Coding to provide easily adaptable and selective transmission reception rates to clients.

U.S. Pat. No. 5,307,376 shows a device for the coherent demodulation of time-frequency interlaced digital data. It doesn't teach how to use Discrete Multiple Tone Coding to provide easily adaptable and selective transmission reception rates to clients.

U.S. Pat. No. 5,381,459 shows a system for distributing radio telephone signals over a cable television network. It doesn't teach how to use Discrete Multiple Tone Coding to provide easily adaptable and selective transmission reception rates to clients.

The IBM Technical Disclosure Bulletin, Vol. 33, No. 9, pp. 218–221, February 1991, describes a method for constructing multiple-access networks based on optical subcarrier multiplexing. It doesn't teach how to use Discrete Multiple Tone Coding to provide easily adaptable and selective transmission reception rates to clients.

Europe Patent WO90/12467 shows a method in the transmission of a digital broadband signal via a plurality of digital subchannels having arbitrary propagation times. It doesn't teach how to use Discrete Multiple Tone Coding to provide easily adaptable and selective transmission reception rates to clients.

U.S. Pat. No. 4,881,241 shows how to encode the data in the form of binary words using a redundant code to obtain a sequence of modulation symbols and transmitting the symbols in a plurality of subchannel. It doesn't teach how to use Discrete Multiple Tone Coding to provide easily adaptable and selective transmission reception rates to clients.

U.S. Pat. No. 5,170,413 shows a method of selecting a relatively high reliability signal path between a mobile communication unit and a number of possible base sites. It doesn't teach how to use Discrete Multiple Tone Coding to provide easily adaptable and selective transmission reception rates to clients.

A PHD Dissertation submitted by Antonio Ruiz, one of the current inventors, of the instant application discloses a theory for an orthogonal and parallel-channel implementation of a coded modulation scheme using the Discrete Fourier Transform (DFT). See reference [1].

SUMMARY OF THE INVENTION

It is an object of this invention to provide variable transmission rates to a number of clients with minimum of hardware complexity.

This invention takes advantage of Discrete Multiple Tones (DMT) coding to offer variable rate service with reduced hardware complexity.

More specifically, this invention allows an integral number of modules of one type to be used for all subchannels, where each client is assigned an integral number of such subchannels. The term module in this application shall refer to a z-point IDFT/DFT modulator. In the example shown in this application, $z = 4$; however, any range of values for z may be used. The components to implement this invention require only very simple and regular modules. Each client does not need to implement a complex N-point IDFT modulation, but only a much simpler IDFT modulation with a multiplier. The allocation of communication bandwidth is very flexible.

Accordingly, this invention provides a method and apparatus for transmitting data between a server and plurality of clients, where each client extracts selected signals from a composite signal transmitted from the server and where each client can provide a portion of a composite signal transmitted From the clients to the server over a shared medium. With this invention the available bandwidth of the shared medium is divided into a number of subchannels, each having a minimum basic bandwidth. Then, the number of subchannels required for each of the clients is then determined. A z-point IDFT is applied to each subchannel of a data sequence transmitted from/to each of the clients, where z is multiple of 2 and a function of the minimum basic bandwidth, where the latter application results in a plurality of first coefficients being obtained for each subchannel of the data sequence. The coefficients of the outputs of the z-point IDFTs for all subchannels of the data sequence are multiplied by corresponding second coefficients to obtain a product for each subchannel. The products for the subchannels are then added to each other to obtain a composite signal which is transmitted on the shared medium. Any of the clients may select a number of the subchannels from the composite signal by applying an appropriate DFT and by appropriate multiplier. block.

DESCRIPTION OF THE PREFERRED EMBODIMENT

Figure 1:
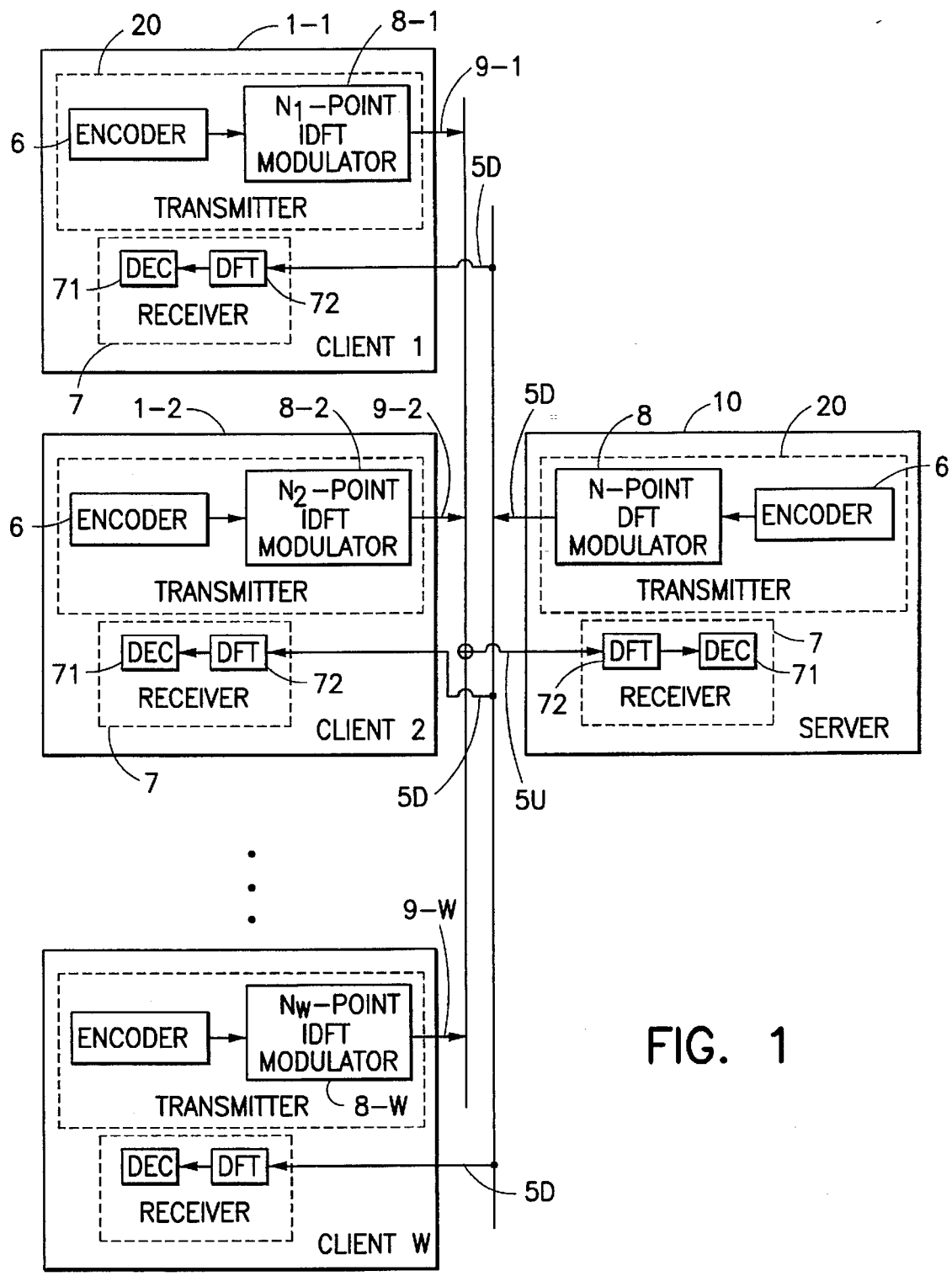
FIG. 1 schematically illustrates the network system configuration according to the invention.

Shown in FIG. 1 is the system configuration used to implement the invention. Shown is server 10 which has a transmitter 20 and receiver 7, where the transmitter has an encoder 6 and an N-point Inverse Discrete Fourier Transform (IDFT) modulator 8. See modulators 8-1 through 8-W in FIG. 1. The essential components of the receiver are a decoder 71 and a Discrete Fourier Transform (DFT) demodulator 72. Shown also in FIG. 1 is the shared medium 5D and 5U, where 5D is used to transmit the downstream signals from the server, while 5U is used to transmit the upstream signals from the client locations (1-1 to 1-W) to the server. Similar to the server, each client location has a receiver, an encoder and an IDFT/DFT modulator; however, each client modulator uses an integral number of modules depending upon the number of subchannels needed by the client, where each subchannel is of fixed bandwidth $\lambda_b$. See FIG. 2.

Figure 3:
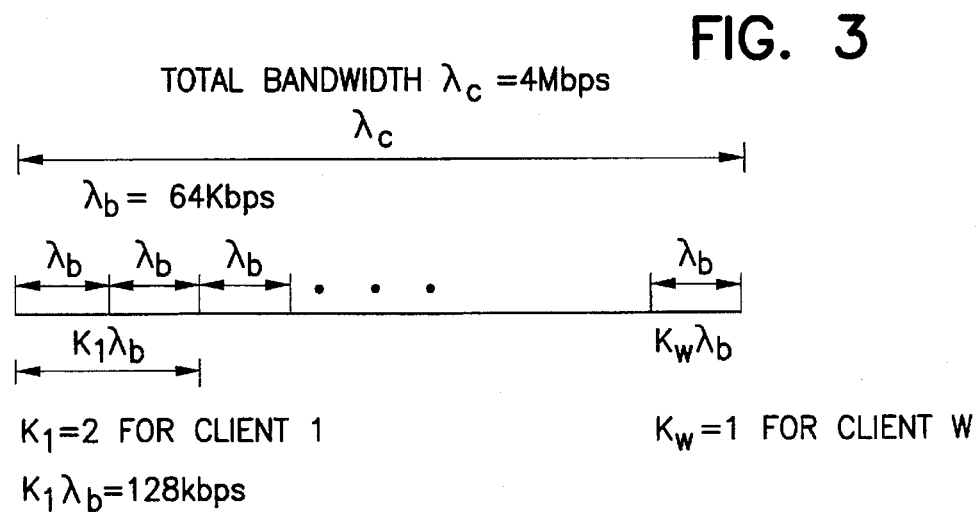
FIG. 3 schematically illustrates the allocation of an integral number of subchannels to each of a number of clients.

Shown in FIG. 3 is the allocation of bandwidth $\lambda_c$ among W clients where $$\lambda_c = \sum_{i=1}^{W} k_i \lambda_b.$$

For example, if client 1 at location 1-1 needs two voice channels, then client 1 will be assigned two subchannels. In such case, client 1 will have two z-point IDFT/DFT hardware modules at his terminal. Referring to FIG. 3, client 1's allocated bandwidth is represented by $k_1 \lambda_b$, where $\lambda_b$ is the minimal subchannel bandwidth that can be allocated to a client. Any other client could also be allocated an integral number times the minimum subchannel bandwidth. FIG. 3 also shows the bandwidth allocated to the remaining W clients, where each client x has a bandwidth of $k_x \times \lambda_b$, where $k_x$ is the number of subchannels allocated to client x at location 1-x.

Figure 2:
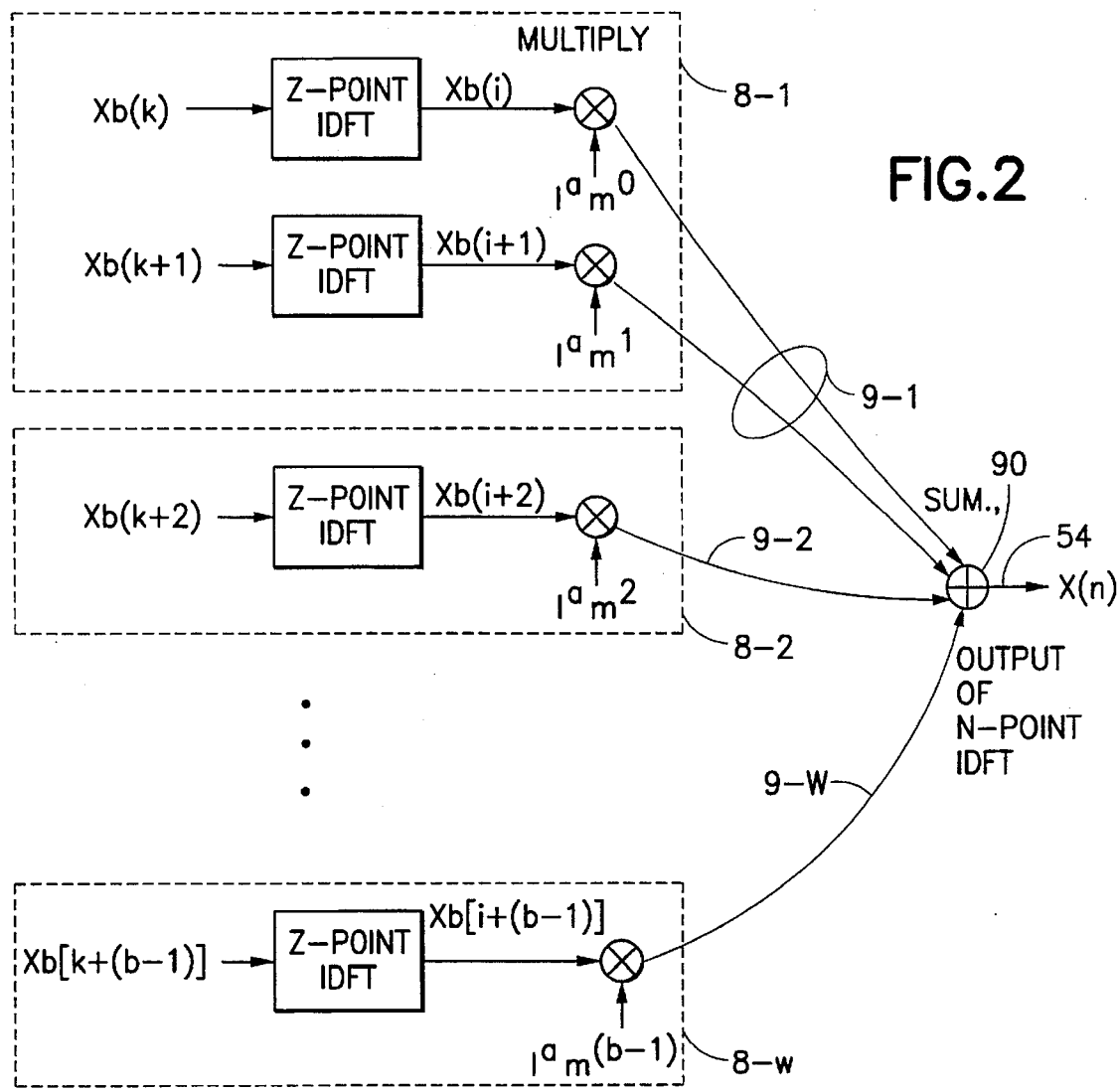
FIG. 2 more specifically demonstrates the use of the IDFT/DFT (Inverse Discrete Fourier Transform/Discrete Fourier Transform) module, which implements the instant invention.

Referring to FIG. 2, the overall operation of the invention will now be described. As described above, client 1 requested two voice channels to carry signals X(bk) and X(bk+1), where each signal is applied to a single z-point IDFT module, where the previous two signals are actually digital signals from encoder 6. See FIG. 1. The encoder is a hardware device which maps digital signals from the client into complex sub-symbols X(bk), X(bk+1), ..., X(bk+(b−1)), where each complex sub-symbol represents the magnitude and phase of individual tones in discrete multiple tone (DMT) coding since the mapping function is a frequency designated coding function, such as the well known Discrete Multiple Tone code. This encoder is implemented on a VLSI chip. The frequency designated coding symbols, such as X(bk) are then applied to the z-point IDFT modulator. The output of the modulator is:

$$x_b(i) = \text{IDFT}[X_b(k)] = \frac{1}{\sqrt{Z}} \sum_{k=0}^{Z-1} X_b(k) e^{j\frac{2\pi i k}{Z}}, \quad 0 \le i \le Z-1.$$

For example, using z=4 in each subchannel, where z represents the number of points used in the IDFT common module, for client 1, the outputs IDFT (X(bk)) and IDFT(X (bk+1)) are each multiplied by $l^a m^0$ and $l^a m^1$ respectively, where $$l = \frac{1}{\sqrt{2}},$$

$$m^g(i) = e^{j\frac{2\pi(bi+g)}{Z}}, \quad 0 \le i \le Z-1 \text{ and } 0 \le g \le b-1.$$

The two products obtained above on 9-1 are then added to each other and to the outputs on 9-2 through 9-W by the summation device 90. The output of the summation device is then a composite signal x(n), which is then transmitted on the shared medium 5U to the server 10. See FIG. 1.

When proceeding downstream from the server, the composite signal is transmitted on shared medium 5D to all of the clients 1 through W. Client 1, for example, has two subchannels, and each subchannel selects z-points (4 points in this case) from N-points in the composite signal. See FIG. 1. These techniques of selection for each subchannel are well known in the art. In this example the composite downstream signal has 256 points.

At each client receiver, we perform demodulation through the inverse operation, the Discrete Fourier Transform (DFT). The DFT output is then decoded to obtain the corresponding information from the composite signal destined for each receiver. We assume the server will serve W clients as in the figure. The above method can be illustrated in the following example:

1. Determine the channel bandwidth, e.g.
   $\lambda_c$=4 Mbps.
2. Determine the basic subchannel bandwidth (i.e. the minimum basic service rate for a client), e.g.
   $\lambda_b$=64 kbps.
   We can then provide $$\frac{\lambda_c}{\lambda_b} = 64 \text{ subchannels.}$$

3. Select a value for z to use in the z-point IDFT/DFT (e.g. z=4) modulator for sending data in each subchannel. This value of z is then used to determine the length of the N-point IDFT/DFT modulation/demodulation. FIG. 2 shows how the small z-point IDFT output signals are combined to generate the composite N-point IDFT output signal.

4. The communication rate of each client can be any multiple of $\lambda_b$ without exceeding the total channel bandwidth. If every client choose the basic service rate, then the channel can serve totally 64 clients at the same time in the example. If a client chooses his service rate at $\lambda_s$=128 kbps, then the client needs 8-point IDFT modulation, which can be implemented from two basic building blocks of 4-point IDFT common modulators (modules).

Below is a simple illustration of how the complex N-point IDFT modulation function can be broken down into less complex z-point IDFT modulation functions, which are used to derive the individual signals in the subchannels assigned to each client. An N-point IDFT can be described as:

$$x(n) = \frac{1}{\sqrt{N}} \sum_{k=0}^{N-1} X(k) e^{j\frac{2\pi nk}{N}} \quad (0 \leq n \leq N-1).$$

For a simple illustration, consider the case where N is an integral power of 2. One can always pad zero's to a sequence to make N become a integral power of z. Since N is an even integer, we can compute x(n) by separating X(k) into two N/2-point sequences consisting of even-numbered points in X(k) and odd-numbered points in X(k). With appropriate substitutions and rearrangements, we can achieve the result $$x(n) = lx_1(n) + lmx_2(n),$$

where $x_1(n)$ and $x_2(n)$ are N/2-point IDFT of the even-numbered and odd-numbered sequences respectively, and $$l = \frac{1}{\sqrt{2}},$$

$$m^g(i) = e^{j\frac{2\pi(bi+g)}{Z}}, \quad 0 \leq i \leq Z-1 \text{ and } 0 \leq g \leq b-1.$$

Consequently, we can keep breaking a computation into even-numbered and odd-numbered points of sequences until they all become the z-point sequence (which is our basic IDFT module). With substitutions and rearrangements, we can obtain the coefficients: $1^a M^0 \cdot 1^a \cdot M^1 \cdot 1^a \cdot M^{(b-1)}$, shown in FIG. 2, where $B = N_z = 2^a$.

The above algorithm can be easily applied to any combination of different size IDFT blocks.

This invention can be implemented at the client arid server locations by the addition of a board having VLSI chips which implement the encoder/decoder and the DFT/IDFT modulator (module).

References

1. Antonio Ruiz, "Frequency-Designed Coded Modulation For Channels With Intersymbol Interference", Ph.D. Dissertation, Stanford University, 1989.
2. A. V. Oppenheim and R. W. Schafer, "Digital Signal Processing", Prentice-Hall (Englewood Cliffs, N.J., 1975).

References 1 and 2 are hereby incorporated herein by reference.

Having thus described our invention, what we claim as new and desire to secure by Letters Patents is:

1. A method of transmitting data between a server and plurality of clients in a network, said method comprising:

a. dividing the available bandwidth of a shared medium between said clients and said server into a total number of subchannels, each subchannel having a minimum basic bandwidth;
   b. determining a number of subchannels required for each of said clients to transmit/receive a data sequence over said network;
   c. applying a z-point IDFT to each subchannel of a data sequence from/to each of said clients, where z is a multiple of two and a function of the minimum basic bandwidth, where a plurality of first coefficients is obtained for each subchannel of said data sequence;
   d. multiplying said first coefficients of the outputs of z-point IDFTs for all subchannels of said data sequence by corresponding second coefficients to obtain a product for each subchannel; and
   e. summing the products for the subchannels to obtain a composite signal to transmit on said shared medium, wherein any of said clients may select a number of said subchannels as determined in step b from said composite signal by applying an appropriate DFT, wherein any said client receives said selected subchannels.

2. An apparatus for transmitting data between a server and a plurality of clients in a network, said apparatus comprising:

a. means for dividing the available bandwidth of a shared medium between said clients and said server into a total number of subchannels, each subchannel having a minimum basic bandwidth;
   b. means for determining a number of subchannels required for each of said clients to transmit/receive a data sequence over said network;
   c. means for applying a z-point IDFT to each subchannel of a data sequence from/to each of said clients, where z is a multiple of two and a function of the minimum basic bandwidth, where a plurality of first coefficients is obtained for each subchannel of said data sequence;
   d. means for multiplying said first coefficients of the outputs of z-point IDFTs for all subchannels of said data sequence by corresponding second coefficients to obtain a product for each subchannel; and
   e. means for summing the products for the subchannels to obtain a composite signal to transmit on said shared medium, wherein any of said clients may select a number of said subchannels as determined at b from said composite signal by applying an appropriate DFT, wherein any said client receives said selected subchannels.

* * * * *